(12) United States Patent
Malat et al.

(10) Patent No.: US 8,707,403 B2
(45) Date of Patent: Apr. 22, 2014

(54) SUBSCRIPTION INTERFACE FOR PROVIDING ACCESS TO DIGITAL PUBLICATIONS

(75) Inventors: Jonathan C. Malat, Plainview, NY (US); Justin V. Raimo, Port Monmouth, NJ (US); Matthew K. Luther, Tampa, FL (US); Abraham Cytryn, Brooklyn, NY (US); F. Jason Stein, Irvington, NY (US); Dennis B Golovaty, New York, NY (US); Robert Ferreira, Pearl River, NY (US); Leon M. Misiukiewicz, Summit, NJ (US)

(73) Assignee: Time Inc., New York, NY (US)

( * ) Notice: Subject to any disclaimer, the term of this patent is extended or adjusted under 35 U.S.C. 154(b) by 257 days.

(21) Appl. No.: 13/207,353

(22) Filed: Aug. 10, 2011

(65) Prior Publication Data
US 2013/0042308 A1    Feb. 14, 2013

(51) Int. Cl.
*G06F 21/00* (2013.01)
(52) U.S. Cl.
USPC .............. 726/5; 713/168; 713/186; 713/187; 713/188; 709/220; 709/223; 705/51; 705/67; 705/80; 463/29; 463/42
(58) Field of Classification Search
USPC .......................................................... 726/5
See application file for complete search history.

(56) References Cited

U.S. PATENT DOCUMENTS

| | | | | |
|---|---|---|---|---|
| 7,277,953 | B2 * | 10/2007 | Wils et al. ..................... | 709/229 |
| 7,415,620 | B2 * | 8/2008 | England et al. ............... | 713/193 |
| 2007/0061266 | A1 * | 3/2007 | Moore et al. .................... | 705/51 |
| 2008/0215492 | A1 * | 9/2008 | Pieper et al. .................... | 705/59 |
| 2012/0297490 | A1 * | 11/2012 | Barraclough et al. .......... | 726/26 |

OTHER PUBLICATIONS

Supporting and enhancing scholarship in the digital age|http://cjc-online.ca/index.php/journal/article/viewArticle/1455/1579|LeslieChan|2004|Pages 1-14.*
Arthur Sulzberger, Jr., "Letter to Our Readers: Times Begins Digital Subscriptions," The New York Times, Inside NYTimes.com, 3 pages, Mar. 28, 2011.

* cited by examiner

*Primary Examiner* — Mahfuzur Rahman
(74) *Attorney, Agent, or Firm* — Klarquist Sparkman, LLP (57) ABSTRACT

The present application provides a subscription interface positioned between client devices and third-party digital subscription providers. The subscription interface allows multiple different publication-related applications (e.g., Sports Illustrated, Time magazine, etc.) running on different client devices (e.g., tablets, desktop computers, laptop computers, smart phones, etc.) to obtain a list of digital issues available from an associated third-party digital subscription provider based on entitlements of the user of the client device. The subscription interface ensures that the application receives the list and associated metadata in a desired format for that particular application on a particular client device.

23 Claims, 8 Drawing Sheets

| SUBSCRIPTION STRATEGY (710) | FILTER STRATEGY (720) | SUBSCRIPTION INTERFACE ACTION (730) |
|---|---|---|
| ALL OR NOTHING | FULL CATALOG | FOR ACTIVE SUBSCRIBERS, PASS BACK A LIST OF ALL ISSUES WITH MARKINGS. FOR INACTIVE SUBSCRIBERS, PASS BACK A LIST WITHOUT MARKINGS |
| ALL OR NOTHING | PURCHASED ONLY | FOR ACTIVE SUBSCRIBERS, PASS BACK A LIST OF ALL ISSUES WITH MARKINGS. FOR INACTIVE SUBSCRIBERS, PASS BACK AN EMPTY LIST |
| DATE RANGE | FULL CATALOG | FOR ACTIVE SUBSCRIBERS, PASS BACK A LIST OF ALL ISSUES IN ACTIVE DATE RANGE. FOR INACTIVE SUBSCRIBERS, PASS BACK A LIST WITHOUT MARKINGS |
| DATE RANGE | PURCHASED ONLY | FOR ACTIVE SUBSCRIBERS, PASS BACK A LIST OF ALL ISSUES PURCHASED. FOR INACTIVE SUBSCRIBERS, PASS BACK LIST OF ISSUES PURCHASED |
| ACTIVE ALL / INACTIVE FINAL DATE | FULL CATALOG | FOR ACTIVE SUBSCRIBERS, PASS BACK A LIST OF ALL ISSUES WITH MARKINGS. FOR INACTIVE SUBSCRIBERS, ONLY ISSUES UP TO FINAL ACTIVE DATE |
| ACTIVE ALL / INACTIVE FINAL DATE | PURCHASED ONLY | FOR ACTIVE SUBSCRIBERS, PASS BACK A LIST OF ALL ISSUES WITH MARKINGS. FOR INACTIVE SUBSCRIBERS, PASS BACK A SUBSET OF LIST UPTO FINAL ACTIVE DATE |
| ACTIVE SUBSCRIBER CHECK | FULL CATALOG | FOR ACTIVE SUBSCRIBERS, PASS BACK "TRUE". FOR INACTIVE SUBSCRIBERS, PASS BACK "FALSE" |
| ACTIVE SUBSCRIBER CHECK | PURCHASED ONLY | FOR ACTIVE SUBSCRIBERS, PASS BACK "TRUE". FOR INACTIVE SUBSCRIBERS, PASS BACK "FALSE" |

FIG. 8

SUBSCRIPTION INTERFACE FOR PROVIDING ACCESS TO DIGITAL PUBLICATIONS

FIELD

The present application concerns publications, and, more particularly, providing digital publications from third-party digital subscription providers.

BACKGROUND

Sales of periodical literature are becoming increasingly popular. Subscription providers publish new issues on a regular basis, such as daily, weekly, monthly or quarterly. The most familiar examples are newspapers or magazines. The periodicals are typically referenced by volume and issue numbers. The volume refers to the number of years that the publication has circulated, while the issue refers to how many times the periodical has been published during any given year. More recently, publishers are allowing issues to be accessed digitally over the Internet.

The New York Times is an example of a newspaper that allows active print subscribers access to digital issues of the newspaper. For example, a print subscriber to the New York Times receives an automatic free all-digital subscription, which allows access to content using smartphones, tablets, and computers. For digital access, an application is downloaded to the user's client device. The user then clicks on the application and the application calls a dedicated New York Times server. After an authentication process is completed, the user obtains access to the desired digital issues. If the user terminates their print subscription, then all digital access rights are terminated. Digital only access is also available.

In order to allow access to digital issues, the New York Times invested in server and software development at a high cost. Other companies that want to publish periodicals must individually duplicate the efforts of the New York Times. Thus, each publisher must develop all of the software and systems needed to authenticate users and format the content for particular clients.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present application provides a subscription interface positioned between multiple client devices and third-party digital subscription providers. The subscription interface allows different publication-related applications (e.g., Sports Illustrated, Time magazine, etc.) running on different client devices (e.g., tablets, desktop computers, laptop computers, smart phones, etc.) to obtain a list of digital issues available from an associated third-party digital subscription provider based on entitlements of the user of the client device. The subscription interface ensures that the application receives the list and/or associated metadata in a desired format for the particular application. Additionally, the subscription interface can identify for the application which issues in the list are available for viewing and where to obtain the content should the user select it.

In one embodiment, the subscription interface receives an application identification and user identification (which typically includes a user name and password) from a client device. The application identification can be used to determine the third-party subscription provider associated with the application. Information associated with the user identification or the user identification itself can then be passed to the third-party subscription provider to search for entitlements for the user. The entitlements can then be passed back to the subscription interface. The entitlements are an identification of issues available to the user, such as a date range indicating which issues the user can access (i.e., an active date range). Based on the entitlements, the subscription interface can send a list of issues back to the client device for display.

In another embodiment, the subscription interface can format the list as desired by the application. For example, some applications want the latest issues listed first, while other applications want a different order. Whatever the order and whatever the format, the subscription interface can properly format the list for the application. Associated metadata can likewise be formatted. Additional filtering strategies can also be used by the subscription interface based on the application. Thus, the subscription interface stores the predetermined formats and filtering strategies so that when clients want to access digital content, the subscription interface can dynamically generate a properly formatted list.

The subscription interface can also handle account creation, account management, authentication, authorization and payment management, if desired. Authentication typically entails checking whether a received user name and password match stored versions thereof. Authorization typically entails allowing access to issues based on a contract between the user and third party, stored business rules, etc.

Through the subscription interface, third-party publishers can integrate standard printed publications and digital content in a seamless way. For example, digital content can be treated just like printed publications. Once a user buys access to digital content, the user can always have access to that content regardless if the user ends their print subscription, just like a user maintains received printed publications after terminating a subscription.

The foregoing and other objects, features, and advantages of the invention will become more apparent from the following detailed description, which proceeds with reference to the accompanying figures.

DETAILED DESCRIPTION

Figure 1:
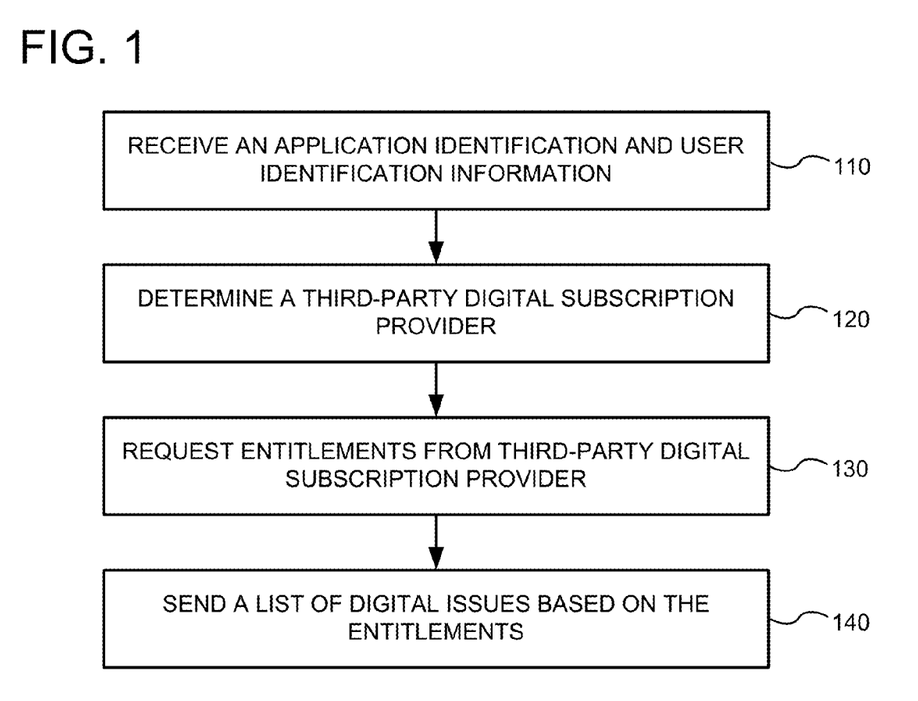
FIG. 1 is a flowchart of a method for sending a list of digital issues to a client device based on entitlements.

FIG. 1 is a flowchart of a method for sending a list of digital issues to a client device based on entitlements. The client device can be any of a variety of devices, such as tablets, desktop computers, laptop computers, smart phones, etc., that are based on different platforms and run different operating systems. Each client device can run a different application for accessing digital issues of a publication. For example, a Sports Illustrated® application on a smart phone can list issues in a different format than a Sports Illustrated application on a computer. To a user, the Sports Illustrated icon appears the same, but the underlying application can be different for each client device platform. Likewise, different applications (e.g., Time magazine, People magazine, etc.) for accessing different publications can format content and provide a different look-and-feel. The entitlements for the accessing the different publications may also be controlled by different third-party digital subscription providers. For example, a user may have entered into print subscriptions with different companies and each company may have different contract terms for digital access.

In process block 110, a subscription interface receives an application identification and user identification information. The application identification can be an identifier for the application, such as a number, text, a GUID, etc. The user identification information can be a user name (e.g., email address) and password or the user identification information can be a token. In any event the user identification information uniquely identifies the user. In process block 120, a third-party digital subscription provider can be determined. For example, the application identification can be used to access a database to obtain an associated third-party digital subscription provider. Typically, infrastructure rules store an IP address associated with a third party digital subscription provider that can be used to request entitlements. The subscription interface can use all or part of the user identification information itself to request entitlements or it can use the user identification information to access the database and obtain a user number or other user id. In process block 130, the subscription interface requests entitlements for the user from the determined third-party subscription provider. In return, the subscription interface receives information (e.g., date range, list of issues, etc.) that the user of the client device is entitled to view based on an active or expired contract between the user and the third-party subscription provider. In process block 140, using the information from the third-party subscription provider, a list of digital issues is sent back to the client device. The list of digital issues is not the content of the issues themselves, but rather a list of issues wherein any of the issues can be selected to either view the issue directly or indirectly (e.g., through purchasing the issue). The subscription interface can also handle account creation, account management, authentication, authorization and payment management, if desired. Authentication typically entails checking whether a received user name and password match stored versions thereof. Authorization typically entails allowing access to issues based on a contract between the user and third party, stored business rules, etc.

Figure 2:
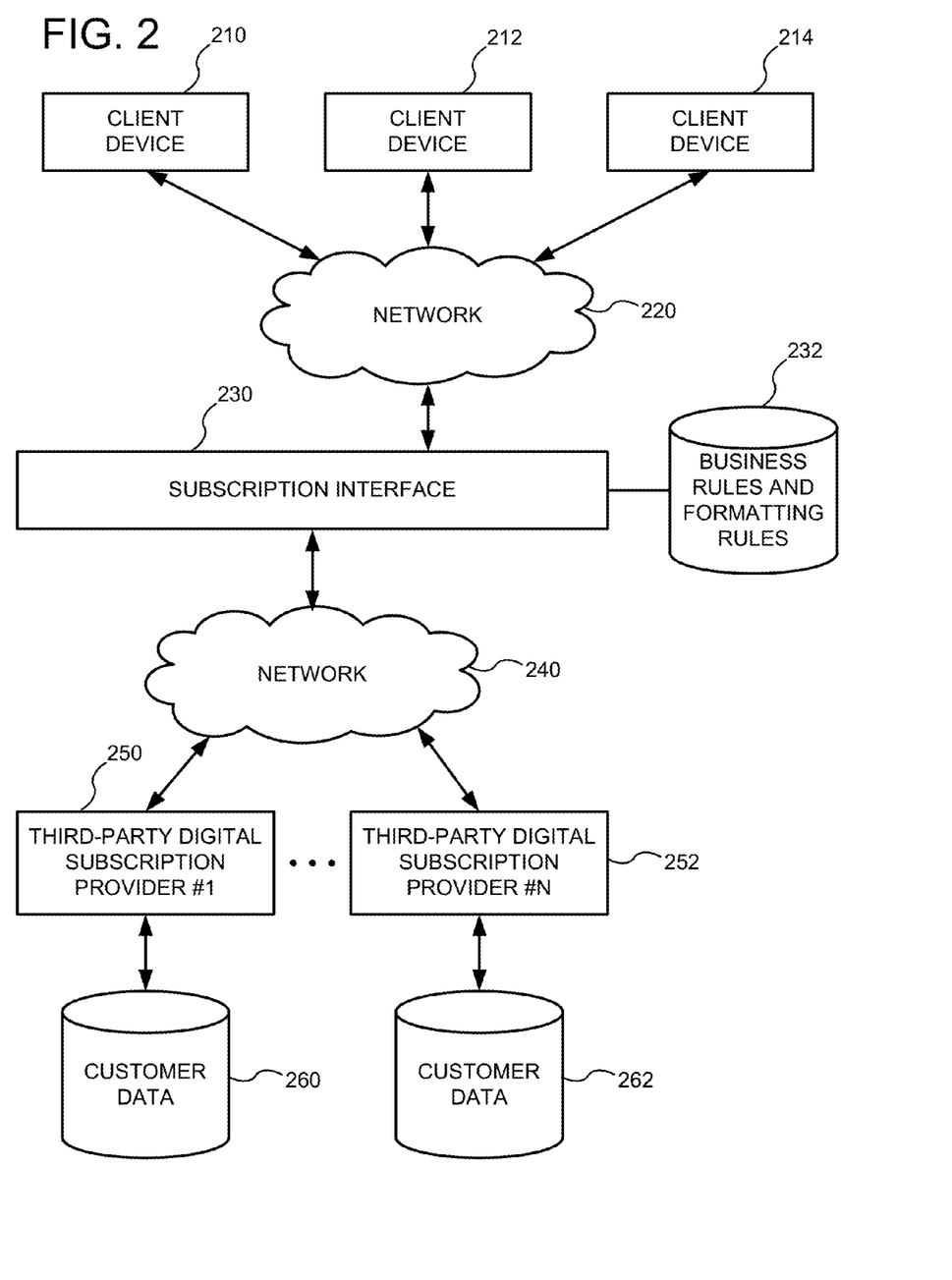
FIG. 2 is a system diagram showing a subscription interface positioned between multiple client devices and multiple third-party subscription providers.

FIG. 2 is a system diagram showing a subscription interface positioned between multiple client devices and multiple third-party subscription providers. The system includes multiple client devices, such as shown at 210, 212, and 214. Any number of client devices can be used. Additionally, the client devices can run based on different platforms designed for the particular client device type. The client devices couple through a network 220, such as the Internet, to a subscription interface 230. The subscription interface 230 can be coupled to a database 232 that provides business and formatting rules for applications running on the client devices. Using the information from the database, the subscription interface can customize each list of available issues in accordance with predetermined rules of the client application. The rules may be based on formatting of the lists or formatting of metadata (anything can be included as metadata, such as, addresses pointing to content, encrypted keys that allow applications to access content, content to be presented as an enticement to view an issue, etc.). The rules can also be based on the user subscription with the third party digital subscription provider. Thus, a third-party contract can change the format of the list ultimately presented on the client. The subscription interface 230 is coupled through a network 240, such as the Internet, to multiple third-party digital subscription providers, 250, 252. Although only two are shown, there can be any number of third-party digital subscription providers coupled to the system. Each third party subscription provider has an associated database 260, 262 that includes entitlement information for users that have entered into contracts with the third-party digital subscription provider. The third-party digital subscription providers are different companies that independently contracted with a user of the client devices. In a typical example, a user subscribed for a magazine or some other publication and the third-party digital subscription provider is associated with or is the fulfillment house that provides the printed publications to the user. The user can then also have access to digital issues based on the contract.

Figure 3:
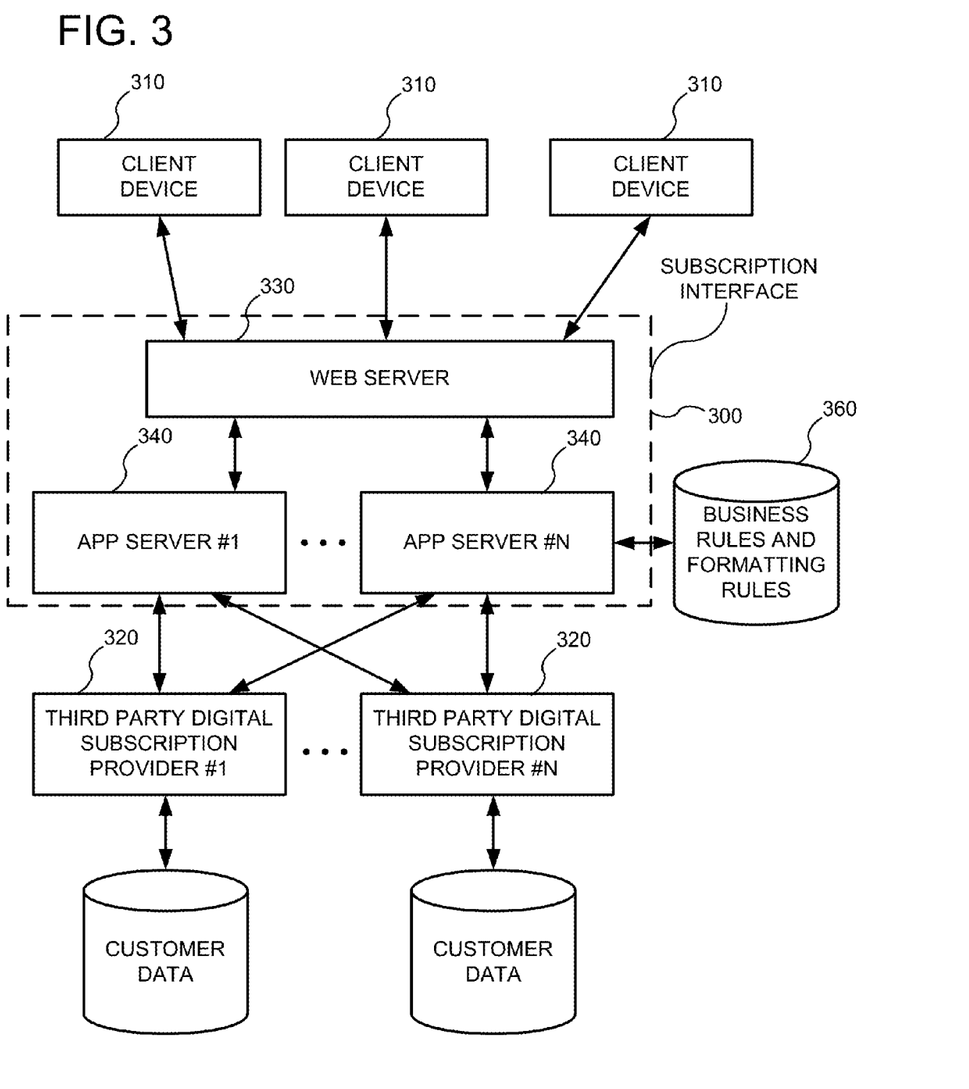
FIG. 3 is a system diagram of an embodiment showing additional details of the subscription interface of FIG. 2.

FIG. 3 shows another embodiment of a system having a subscription interface 300 positioned between multiple client devices 310 and multiple third-party subscription providers 320. The client devices 310 and the third-party subscription providers 320 are similar to those described in relation to FIG. 2 and will not be re-described. The subscription interface 300 can include a web server 330, as is well-understood in the art. Although only shown as a single web server, the web server 330 can be a server farm including any number of desired servers. Although not shown, the web server 330 can include or be coupled to a load balancer that balances loads from the client devices 310 to the web server farm 330. The web server 330 then distributes the requests to one or more application servers 340. Any desired number of application servers 340 can be used depending on the system requirements. The application servers 340 are connected to one or more databases 360 that can include the business rules and/or the formatting rules. The application servers 340 run software, such as APIs, that implement the method described herein. The structure of FIG. 3 is one exemplary structure for the subscription interface and other structures can be used and are well-known in the art.

Figure 4:
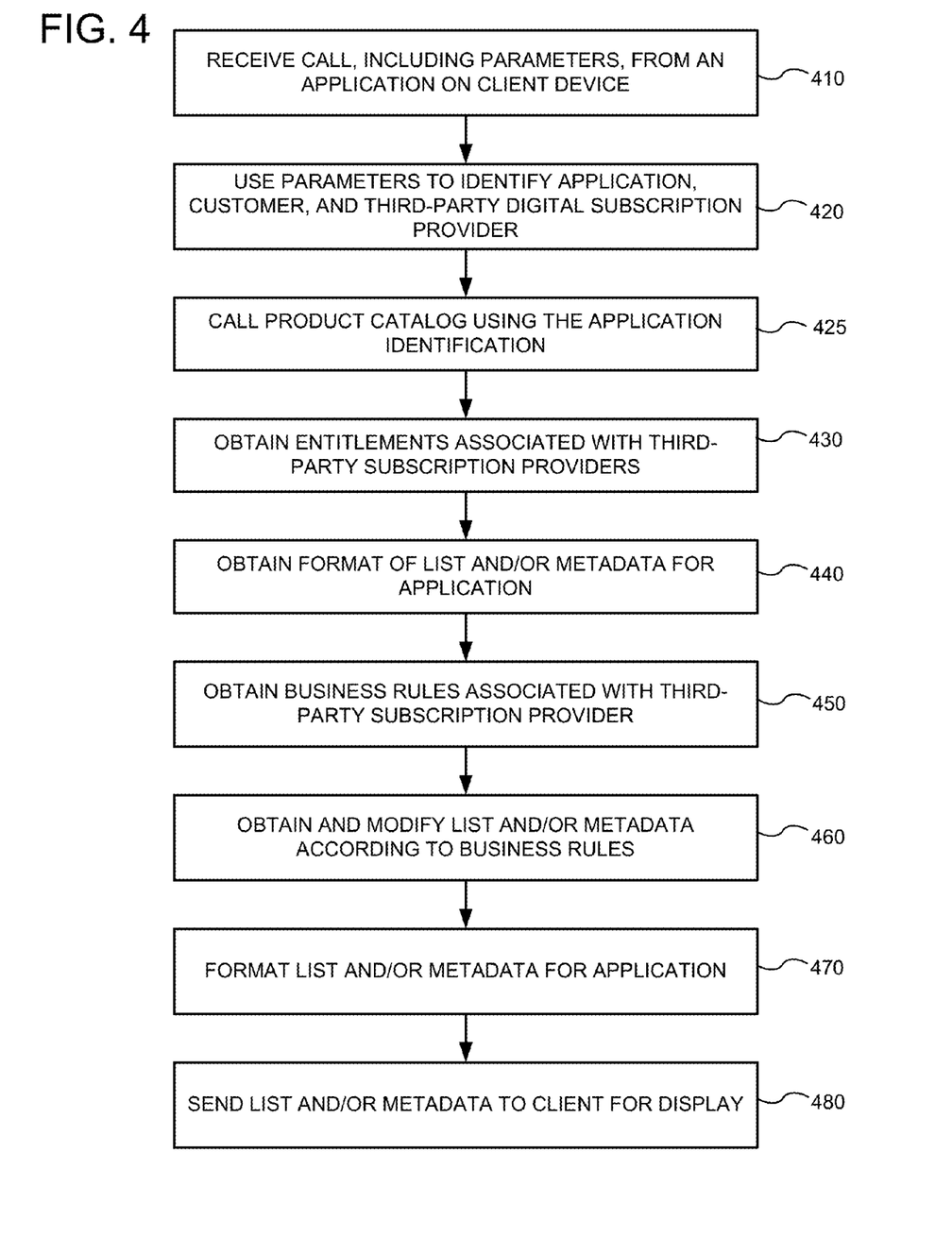
FIG. 4 is a detailed flowchart of an embodiment for displaying a list of digital issues on a client device.

FIG. 4 is a detailed flowchart of a method for sending a list of issues to an application on a client device. In process block 410, a call is received in the subscription interface from an application on the client device. The call can be initiated by launching the application, which is well understood in the art. The call can include parameters, such as an application identification and user identification (which can be within an authentication token). Other parameters can also be included. In process block 420, the parameters are used to identify the application that made the call, the customer (e.g., the subscriber), and the third-party digital subscription provider. Typically, the third-party digital subscription provider is not included with the parameters, but is determined through a lookup in a database coupled to the subscription interface. In process block 425, a call is made to a product catalog. The product catalog is a third-party database that includes information about issues of the publication associated with the identified application. In response to the call, the product catalog can pass back one or more of the following information: an issue date, a cover story, a protected content location, a cover image location and a theme of the issue. In process block 430, entitlements are obtained associated with the third-party subscription providers. The entitlements can be obtained through a request made to the third-party digital subscription provider. The request can include multiple sub-requests. For example, a request (e.g., a lookup) for a customer account number can be made based on portions of the user identification. Then a request can be made to the third-party subscription provider to respond with digital entitlements (e.g., such as a date range). The request can include the customer account number and an issue code. Additional information from the third-party subscription provider can also be provided, such as whether the account is currently active or not. In process block 440, formatting information is obtained associated with the application. The formatting information describes a desired format (arrangement of data) for a list and/or metadata that is passed back to the application from the subscription interface. In one embodiment, the formatting information is obtained by the subscription interface using the application identification as a key into a database. In process block 450, business rules associated with the third-party subscription provider are obtained, such as by using the same technique used to obtain the formatting information. In process block 460, the list is obtained, modified or otherwise generated using the entitlements obtained in process block 430 and the business rules obtained in process block 450. For example, a date range can be used to generate the list and metadata. The digital issues can be analyzed individually to determine if the name/cover date field falls within the range of entitled issues. If so, the issue is marked as purchased. In process block 470, the list and metadata are formatted as needed for the application. In process block 480, the list and/or metadata are sent to the client for display. Typically, the metadata sent back can include the issue date, the cover story, the protected content location, the cover image location, the theme of the issue, etc. The exact information and format depends on the particular application.

Figure 5:
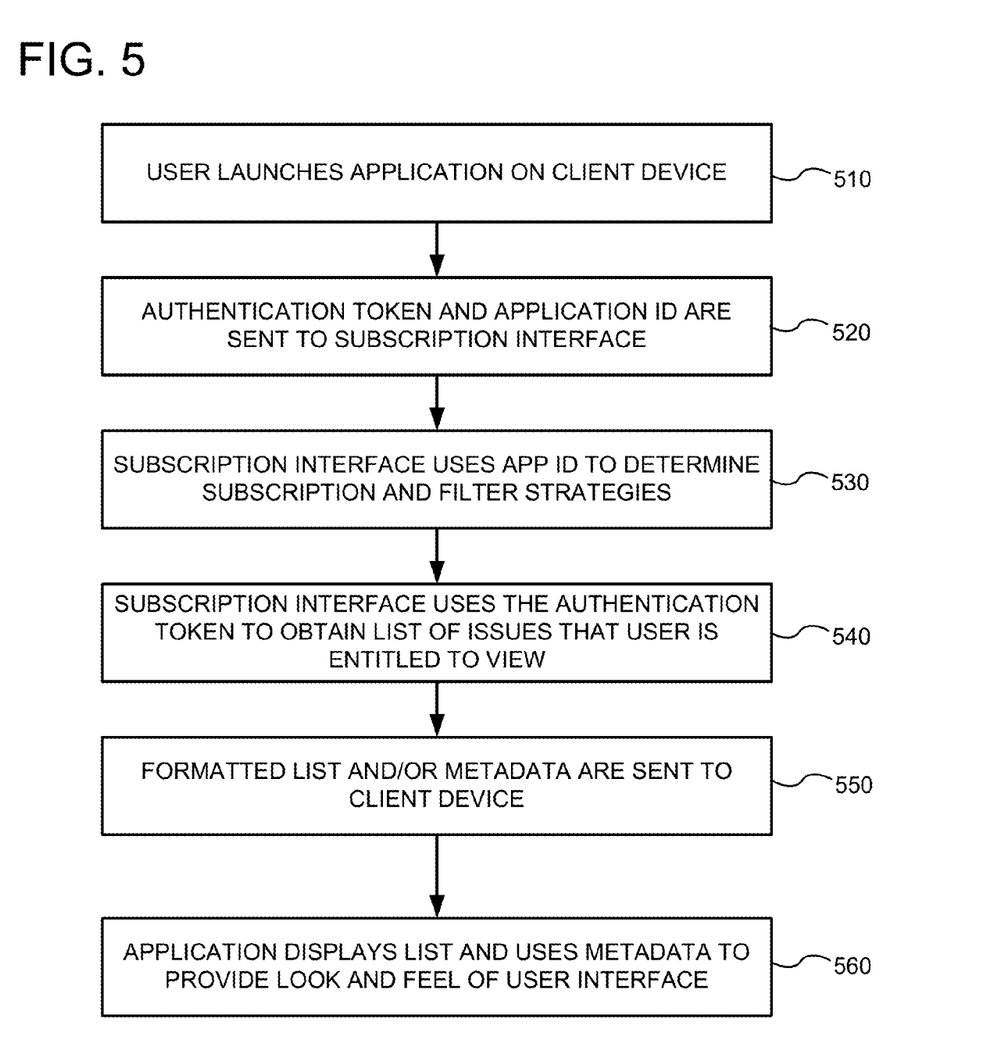
FIG. 5 is another detailed flowchart of an embodiment for displaying a list of digital issues on a client device.

FIG. 5 is another detailed flowchart of an embodiment for displaying a list of digital issues on a client device. In process block 510, a user launches an application on a client device, as is well understood in the art. When the application launches, in process block 520, it automatically sends an authentication token associated with the user (and which uniquely identifies the user) and an application identification (which need not be unique, but simply provides the name of the application) to the subscription interface. In process block 530, the subscription interface uses the application identification to determine the subscription and filter strategies associated with the application. In process block 540, the subscription interface determines a list of issues that the user is entitled to view based on information received from a third-party digital subscription provider. In process block 550, the subscription interface sends a formatted list and/or metadata to the client device. The metadata can include information that assists the application in presenting the list. For example, an address of where to obtain each image of the cover of the magazine can be included as well as a short description of the issue. Other metadata can also be included, such as information needed to access the actual content of the issue. In process block 560, the application displays the list in whatever look and feel it decides upon.

Figure 6:
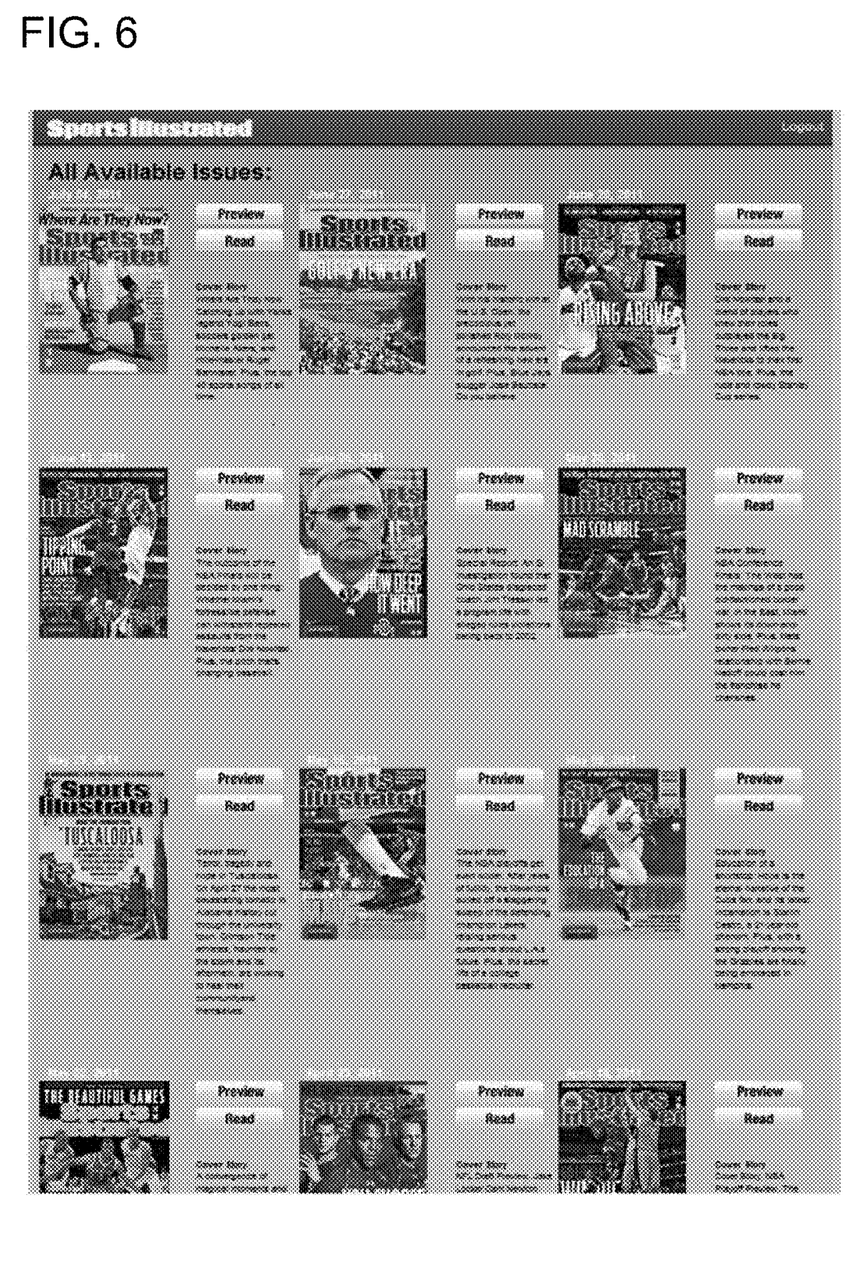
FIG. 6 shows an example list displayed on a client device.

FIG. 6 is an example of a display on a client device including a list of issues of Sports Illustrated® that the user is entitled to read. Once the user is entitled, he/she can read the issues even after their subscription expires. In order to view the full content of an issue, the user clicks on a "read" button adjacent to the issue. At that point, the application retrieves the actual content of the issue using metadata supplied by the subscription interface. The subscription interface need not further participate in the process of obtaining the actual content of the issue, as the application on the client device can directly access such content. The look and feel of the list is chosen by the application running on the client device. However, information supplied by the subscription interface controls which issues are displayed for user access.

Figure 7:
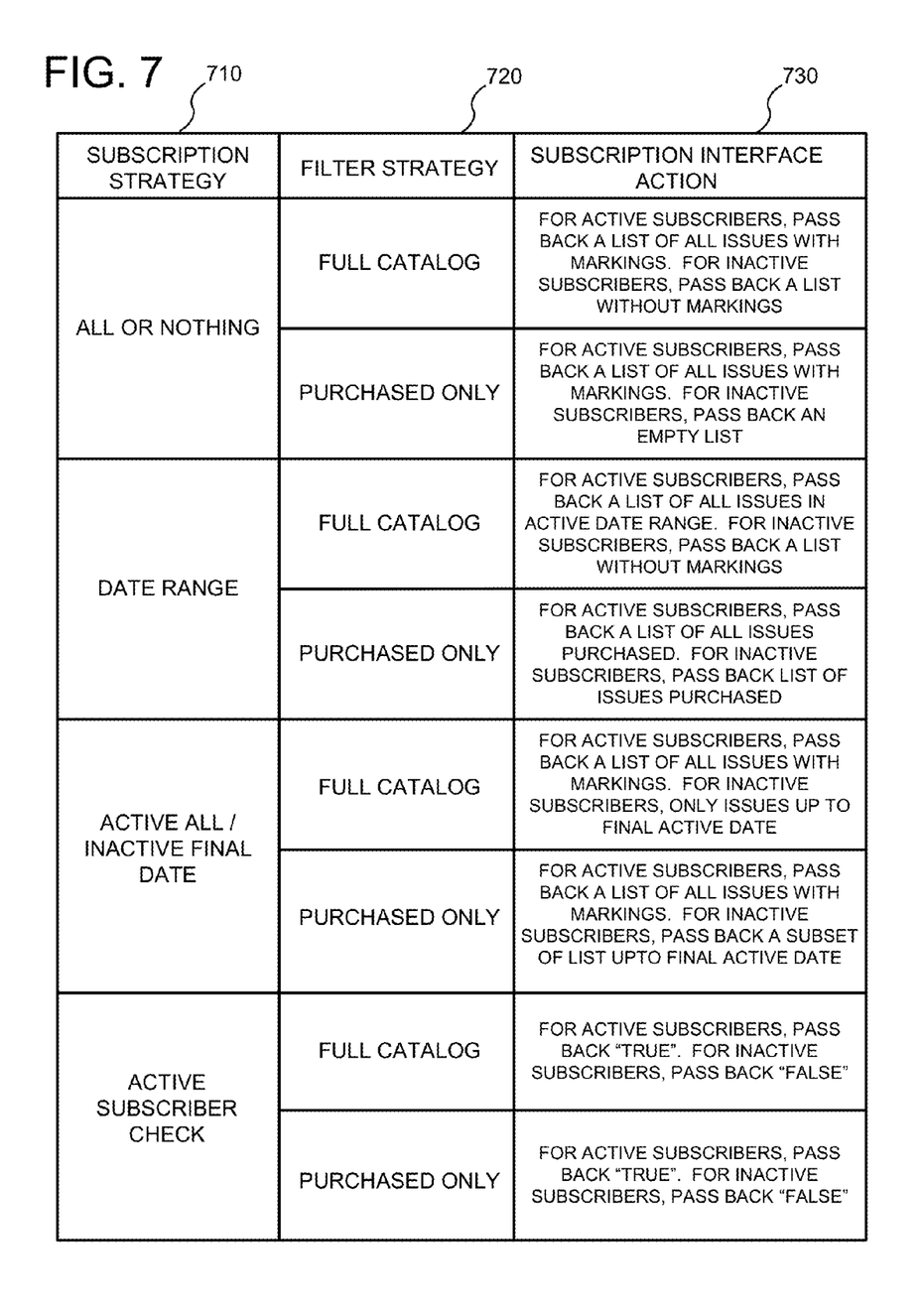
FIG. 7 shows an embodiment illustrating different subscription and filtering strategies that can be applied by the subscription interface.

FIG. 7 is an example table showing the subscription strategies 710 and filter strategies 720 that can be used. The subscription strategy and filter strategy together make up the business rules that are used by the subscription interface to generate the list of available issues to view. The action performed by the subscription interface based on the subscription strategy and filter strategy is shown at 730. As can be seen, the filtered list can change based on whether the user is currently an inactive or active subscriber to the printed publication. Thus, the format of content on a client device can change based on a third-party subscription contract.

Figure 8:
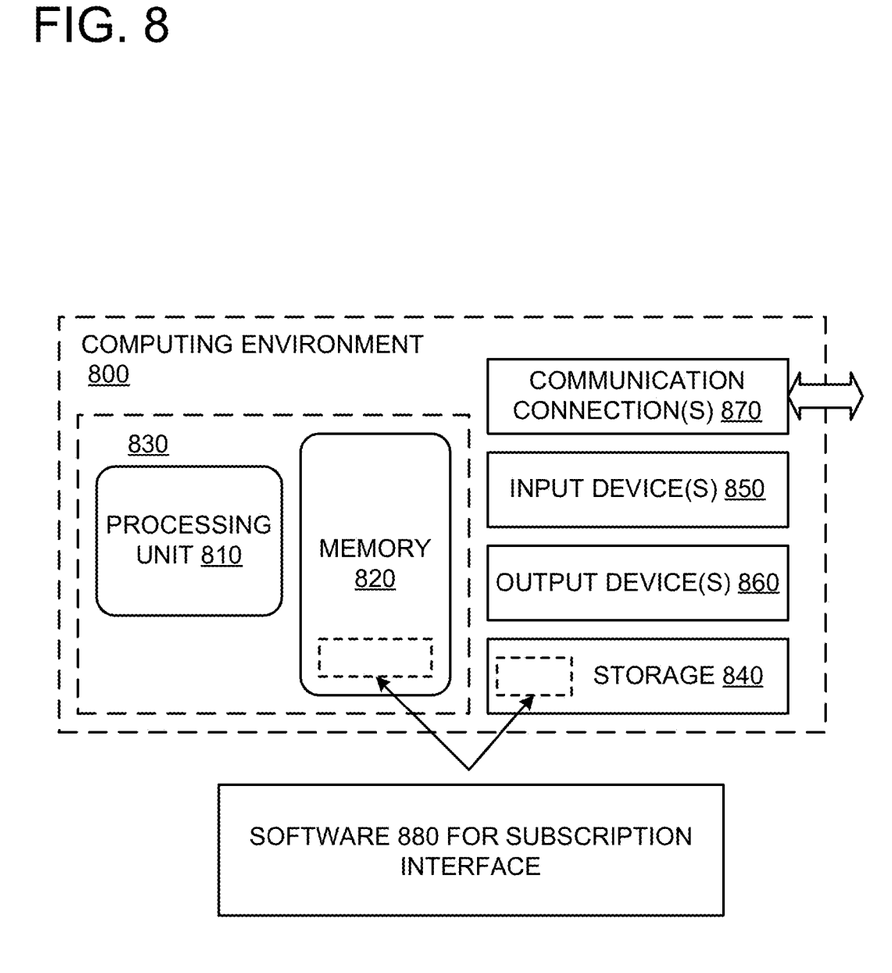
FIG. 8 is an exemplary computing environment that can be used for the application servers in the subscription interface.

The described embodiments, techniques, and technologies can be performed by software and/or hardware of a computing environment. FIG. 8 illustrates a generalized example of a suitable computing environment 800 in which described embodiments, techniques, and technologies can be implemented. Such a computing environment can be used for the application servers 340, shown in FIG. 3. The computing environment 800 is not intended to suggest any limitation as to scope of use or functionality of the technology, as the technology may be implemented in diverse general-purpose or special-purpose computing environments. For example, the disclosed technology may be implemented using a computing device comprising a processing unit, memory, and storage storing computer-executable instructions implementing the technologies described herein.

With reference to FIG. 8, the computing environment 800 includes at least one central processing unit 810 and memory 820. In FIG. 8, this most basic configuration 830 is included within a dashed line. The central processing unit 810 executes computer-executable instructions. In a multi-processing system, multiple processing units execute computer-executable instructions to increase processing power and as such, multiple processors can be running simultaneously. The memory 820 may be volatile memory (e.g., registers, cache, RAM), non-volatile memory (e.g., ROM, EEPROM, flash memory, etc.), or some combination of the two. The memory 820 stores software 880 that can, for example, implement the technologies described herein, such as APIs executing in the subscription interface. A computing environment may have additional features. For example, the computing environment 800 includes storage 840, one or more input devices 850, one or more output devices 860, and one or more communication connections 870. An interconnection mechanism (not shown) such as a bus, a controller, or a network, interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other tangible storage medium which can be used to store information and which can be accessed within the computing environment 800. The storage 840 stores computer-executable instructions for the software 880, which can implement technologies described herein.

The input device(s) 850 may be a touch input device, such as a keyboard, keypad, mouse, pen, or trackball, a voice input device, a scanning device, or another device, that provides input to the computing environment 800. For audio, the input device(s) 850 may be a sound card or similar device that accepts audio input in analog or digital form, or a CD-ROM reader that provides audio samples to the computing environment 800. The output device(s) 860 may be a display, printer, speaker, CD-writer, or another device that provides output from the computing environment 800.

The communication connection(s) 870 enable communication over a communication medium (e.g., a connecting network) to another computing entity. The communication medium conveys information such as computer-executable instructions, compressed graphics information, or other data in a modulated data signal.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims and their equivalents.

We claim:

1. A computer-implemented method for providing a list of digital issues available from a third-party digital subscription provider to a client device, comprising:
   receiving an application identification and user identification information from the client device, the application identification associated with an application that was launched on the client device;
   using the application identification, determining the third-party digital subscription provider and a subscription strategy used to generate the list of digital issues to be viewed, the digital issues being associated with digital versions associated with publications;
   requesting the determined third-party digital subscription provider for entitlements associated with the user identification information, the requesting further including using all or part of the user identification information in generating a request to the determined third-party digital subscription provider; and
   based on the entitlements received from the third-party digital subscription provider, generating the list of digital issues using at least the subscription strategy and sending the list of digital issues associated with the third-party digital subscription provider to the client device.

2. The method of claim 1, further including automatically formatting the list of issues based on the application associated with the application identification.

3. The method of claim 1, further including filtering changes based on whether the user identification information is associated with an active print subscriber.

4. The method of claim 1, wherein the application identification is from a first application and further including receiving a second application identification from a second application, different from the first application.

5. The method of claim 1, wherein the user identification information includes a user name and a password.

6. The method of claim 1, wherein the application identification is received by a subscription interface positioned between the third-party digital subscription provider and the client device.

7. The method of claim 5, wherein a subscription interface receives requests from multiple applications and interfaces to multiple third parties.

8. The method of claim 1, further including using all or part of the user identification information to generate a requesting number associated therewith and using the generated number in the request to the determined third-party digital subscription provider.

9. The method of claim 1, wherein the entitlements are based on a contract between a user associated with the user identification information and the third-party digital subscription provider.

10. The method of claim 9, wherein the entitlements already received remain active even when the contract is terminated so that a user can always access paid-for issues.

11. The method of claim 1, further including, based on the entitlements received from the third-party digital subscription provider, sending metadata associated with the list of digital issues.

12. The method of claim 11, wherein the metadata includes an address wherein content of the digital issues is located.

13. The method of claim 1, wherein the list includes all issues of a publication within an active date range.

14. The method of claim 1, wherein the client device receives the list and associated metadata and displays the list with a look and feel as determined by the client device.

15. An apparatus for providing a list of digital issues to a client device, comprising:
   a subscription interface positioned between multiple client devices and multiple third-party subscription providers, the subscription interface including a web server coupled to the client devices and multiple application servers between the web server and the third-party subscription providers, wherein the web server includes a load balancer that decides which of the application servers to distribute a request from one of the client devices, and;
   a database coupled to the subscription interface, the database storing application identifications of applications running on the client devices and associated third-party digital subscription providers; and
   the subscription interface for obtaining the identifications of the applications running on the client devices, determining entitlements for a user of the client device from the third-party digital subscription providers, and sending, to the client device, the list of digital issues to be available thereon, the digital issues being digital versions of publications, wherein the subscription interface uses all or part of a user identification information to generate a requesting number associated therewith and uses the generated number in a request to at least one of the third-party digital subscription providers.

16. The apparatus of claim 15, wherein the third-party subscription providers store contract information associated with users of the client devices.

17. The apparatus of claim 15, wherein the subscription interface formats the lists and other metadata based on the particular application running on the client device.

18. A computer-implemented method for providing a list of digital issues available from a third-party digital subscription provider to a client device, comprising:
   receiving a first request from an application on the client device, the first request being a call from the application that was launched on the client device, the first request including an application identifier and user identification information;

using the application identifier in the first request to determine a third-party digital subscription provider associated with the application and a subscription strategy for generating a list of digital issues to be viewed, the digital issues being digital versions of publications;

transforming the first request into a second request that is transmitted to the determined third-party digital subscription provider, the second request being generated using all or part of the user identification information;

automatically receiving entitlements from the determined third-party digital subscription provider in response to the second request; and sending the list of digital issues that are available on the client device based on the entitlements for display on the client device.

19. The method of claim 18, wherein the list of digital issues are based on a contract between the user of the client device and the third-party digital subscription provider and the list of digital issues continues to be available even after the contract is terminated.

20. The method of claim 18, wherein using the first request to determine the third-party subscription provider includes using the application identification as a key into a database to find an associated third-party subscription provider.

21. The method of claim 18, further including passing information identifying the user to the third-party digital subscription provider for determining the entitlements.

22. The method of claim 18, further including authenticating a user of the client device using a user identification, which includes a user name and password.

23. The method of claim 18, wherein a subscription interface receives the first request from the application and wherein the subscription interface is adapted to receive requests from multiple different application types and receive entitlements from multiple different third-party digital subscription providers.

* * * * *